US007661182B2

(12) United States Patent
Cantrell

(10) Patent No.: US 7,661,182 B2
(45) Date of Patent: Feb. 16, 2010

(54) PULLEY REMOVAL TOOL

(76) Inventor: Colin Cantrell, 630 - 9th Ave., Kirkland, WA (US) 98033

(*) Notice: Subject to any disclaimer, the term of this patent is extended or adjusted under 35 U.S.C. 154(b) by 750 days.

(21) Appl. No.: 11/228,003

(22) Filed: Sep. 14, 2005

(65) Prior Publication Data

US 2006/0053610 A1 Mar. 16, 2006

Related U.S. Application Data

(60) Provisional application No. 60/609,995, filed on Sep. 14, 2004.

(51) Int. Cl.
*B23P 19/04* (2006.01)

(52) U.S. Cl. .............................. 29/264; 29/256; 29/260

(58) Field of Classification Search ................... 29/267, 29/256, 258, 254, 260, 261

See application file for complete search history.

(56) References Cited

U.S. PATENT DOCUMENTS

| | | | | |
|---|---|---|---|---|
| 837,577 | A | 12/1906 | Loud | |
| 1,227,583 | A | 5/1917 | Connerton | |
| 1,230,448 | A * | 6/1917 | Tuttle | 29/264 |
| 1,361,975 | A | 12/1920 | Eichler | |
| 1,503,129 | A | 7/1924 | Miles, Jr. | |
| 1,620,084 | A | 3/1927 | Dowley | |
| 2,133,697 | A | 10/1938 | Hansen | |
| 3,305,921 | A | 2/1967 | Morse | |
| 3,762,021 | A | 10/1973 | Racin | |
| 4,672,731 | A | 6/1987 | Taylor | |
| 4,970,771 | A | 11/1990 | Wood | |
| 4,982,488 | A | 1/1991 | Ragsdale, Sr. | |
| 5,033,180 | A | 7/1991 | Colson | |
| 5,177,851 | A | 1/1993 | Skoworodko | |
| 2004/0237272 | A1 | 12/2004 | Wilson | |

OTHER PUBLICATIONS

"Pulley Removal Tool", The Alta Performance Group, Alta Performance, website: www.altaminiperformance.com/products/puller/PULLER.html, Mar. 7, 2006 (3 pages).

"Mini Cooper S Pulley Removal Tool", Turner Motorsport, Performance Catalog, website: www.turnermotorsport.com/html/detail.asp?PRODUCT_ID=Puller, Mar. 7, 2006 (2 pages).

"Mini Cooper S Supercharger Pulley Removal Tool", Forge Motorsport, website: www.forgemotorsport.co.uk/contentasp?inc=products&cat=0202&product=FMMINPUL, Mar. 7, 2006 (2 pages).

* cited by examiner

*Primary Examiner*—Lee D Wilson
(74) *Attorney, Agent, or Firm*—R. Reams Goodloe, Jr.

(57) ABSTRACT

A pulley removal tool. The tool includes circular base having a working side and a wrench engaging side. U-shaped flanges extend outwardly from the reverse side of the base. The flanges having fingers and groves therein sized and shaped for close mating engagement drive groove outer surface features of a selected serpentine belt pulley. A threaded drive bolt is provided for working engagement with a shaft end, so that by mechanical leverage between the pulley removal tool and the threaded drive bolt, force is exerted on the shaft end to drive the pulley removal tool away from the shaft end while the pulley removal tool securely grasps the pulley.

20 Claims, 4 Drawing Sheets

PULLEY REMOVAL TOOL

CROSS-REFERENCE TO RELATED APPLICATIONS

The present application is a non-provisional application based on prior U.S. Provisional Patent Application Ser. No. 60/609,995, entitled "Automotive Drive Pulley Removal Tool", filed on Sep. 14, 2004. The present application claims priority from said provisional patent application, and incorporates the same in its entirety by this reference.

TECHNICAL FIELD

This invention relates to pulley removal tools.

BACKGROUND

Various types of tools for removing difficult or frozen parts from shafts have been used for many years. Various removal tools have long provided their unique attributes for various tasks where it was desired to provide a method to pry a wheel or pulley off of a drive or driven shaft. However, there remains a need for an improved tool for removing certain types of pulleys used on serpentine belts, commonly used in automotive applications.

BRIEF DESCRIPTION OF THE DRAWING

The present invention will be described by way of exemplary embodiments, illustrated in the accompanying drawing in which like references denote similar elements, and in which.

The foregoing figures, being merely exemplary, contain various elements that may be present or omitted from actual implementations depending upon the circumstances. An attempt has been made to draw the figures in a way that illustrates at least those elements that are significant for an understanding of the various embodiments and aspects of a pulley removal tool. However, various other elements of a pulley removal tool, especially as may be adapted and attached to various pulleys which are to be removed, and for variations in shafts which may be encountered, may be utilized in order to provide an advantageous pulley removal tool for removing wheel type pulleys from shafts.

DETAILED DESCRIPTION

In the following description, for purposes of explanation, numerous details are set forth in order to provide a thorough understanding of the disclosed embodiments of a pulley removal tool. However, certain of these specific details may not be required in order to practice the certain or other disclosed embodiments of the present invention.

The following description may include terms such as on, onto, on top, underneath, underlying, downward, lateral, and the like, that are used for descriptive purposes only and are not to be construed as limiting. That is, these terms are terms that are relative only to a point of reference and are not meant to be interpreted as limitations, but are instead included in the following description to facilitate understanding of the various aspects of the disclosed embodiments of the present invention.

The phrase "in one embodiment" appears repeatedly. The phrase generally does not require or imply limitation to a specific embodiment, but instead merely denotes that an example provided.

The terms "comprising", "having" and "including" are synonymous, unless the context dictates otherwise.

Figure 1:
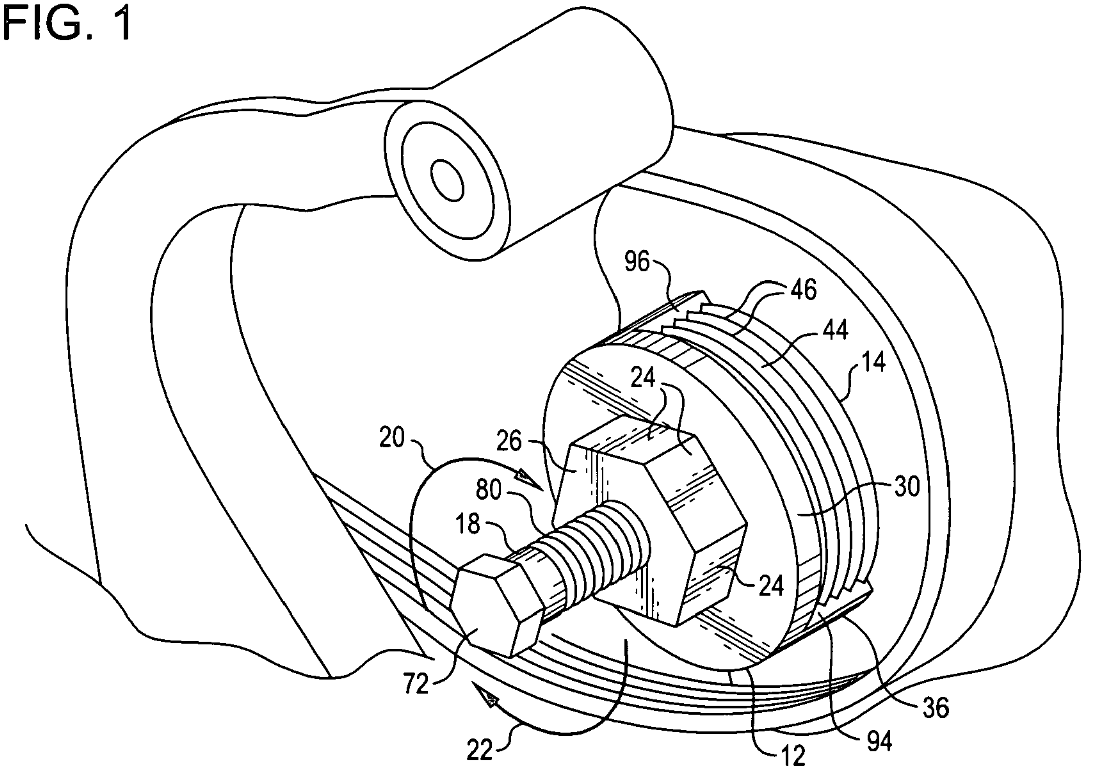
FIG. 1 illustrates a perspective view of an embodiment for a pulley removal tool, showing the tool in use for removal of a pulley in an automotive application, wherein the tool is first placed into an operating position on the pulley, ready for use.
Figure 2:
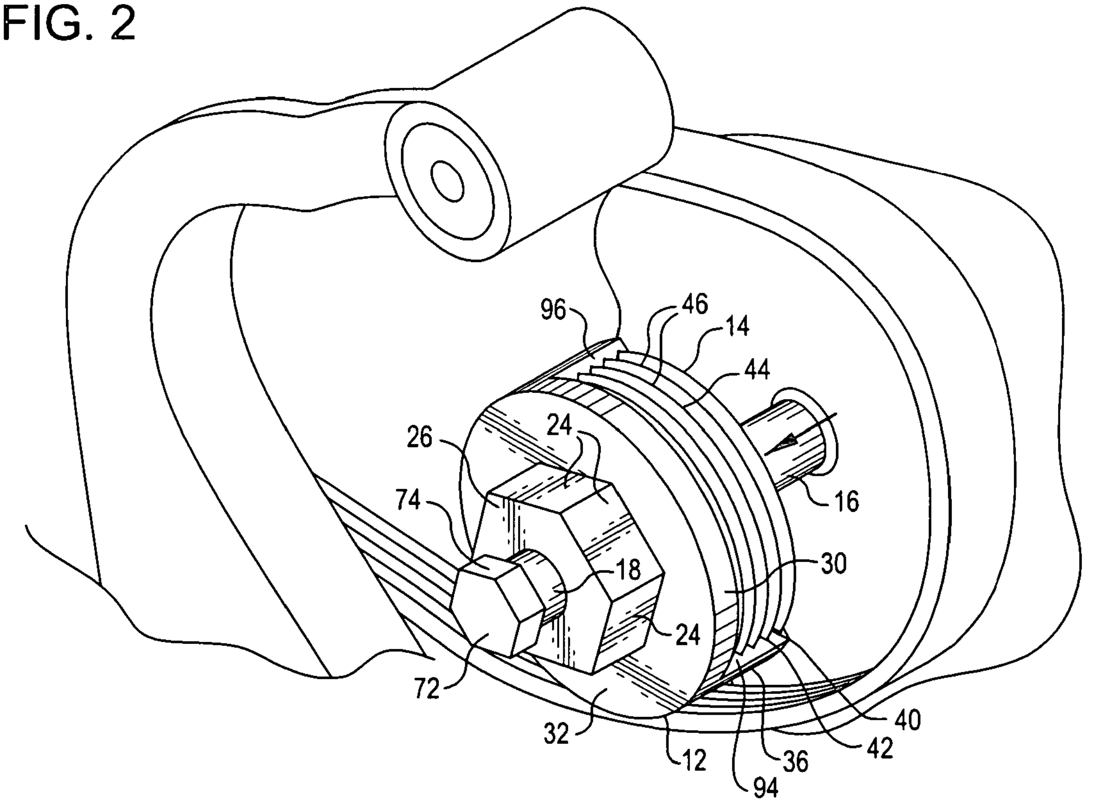
FIG. 2 illustrates a perspective view of an embodiment for a pulley removal tool, similar to FIG. 1, but now showing the tool in use having just removed a pulley in an automotive application, wherein the tool has been utilized to remove the pulley and expose the shaft to which the pulley was affixed.
Figure 3:
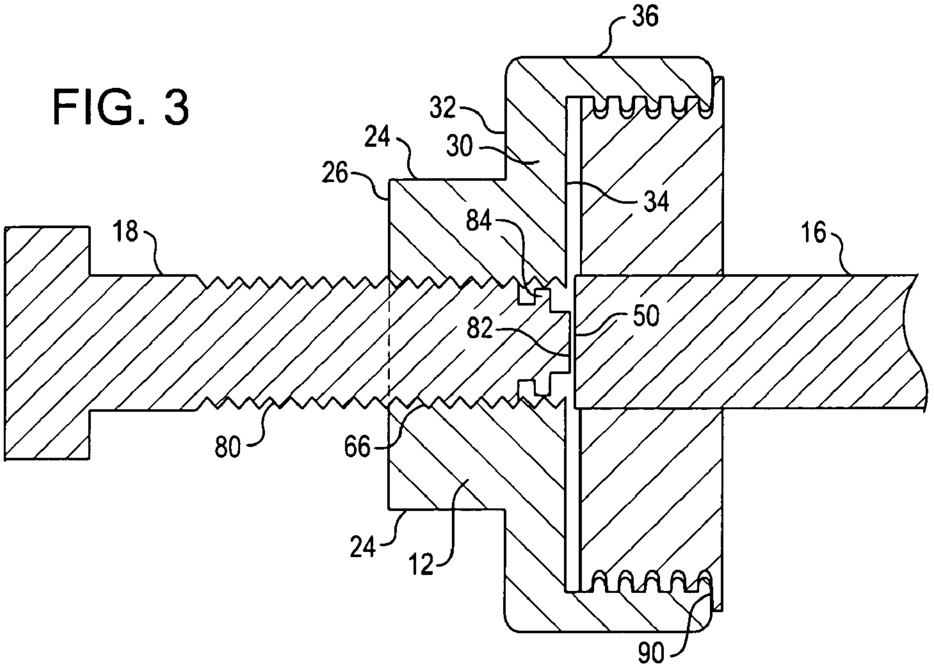
FIG. 3 illustrates a vertical cross-sectional view of a pulley removal tool, showing multiple fingers protruding from the flange of the tool in interlocking mating engagement with the grooves of a multi-groove serpentine drive pulley having a solid drive shaft, with the pulley removal tool in position and ready to begin removal of the pulley from the shaft.
Figure 4:
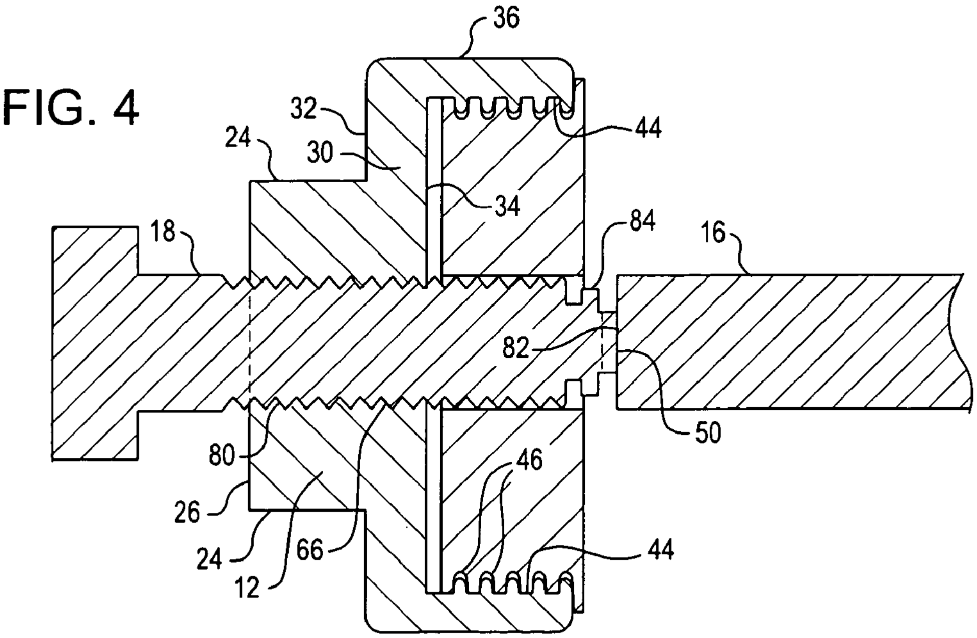
FIG. 4 illustrates a vertical cross-sectional view of a pulley removal tool, showing the tool as placed on a multi-groove serpentine drive pulley having a solid drive shaft as just illustrated in FIG. 3 above, but now showing the tool having just completed extraction of the pulley from the drive shaft, via engagement of the pintle end of a threaded bolt acting against the end of the shaft while the threaded bolt was turned relative to the tool.
Figure 7:
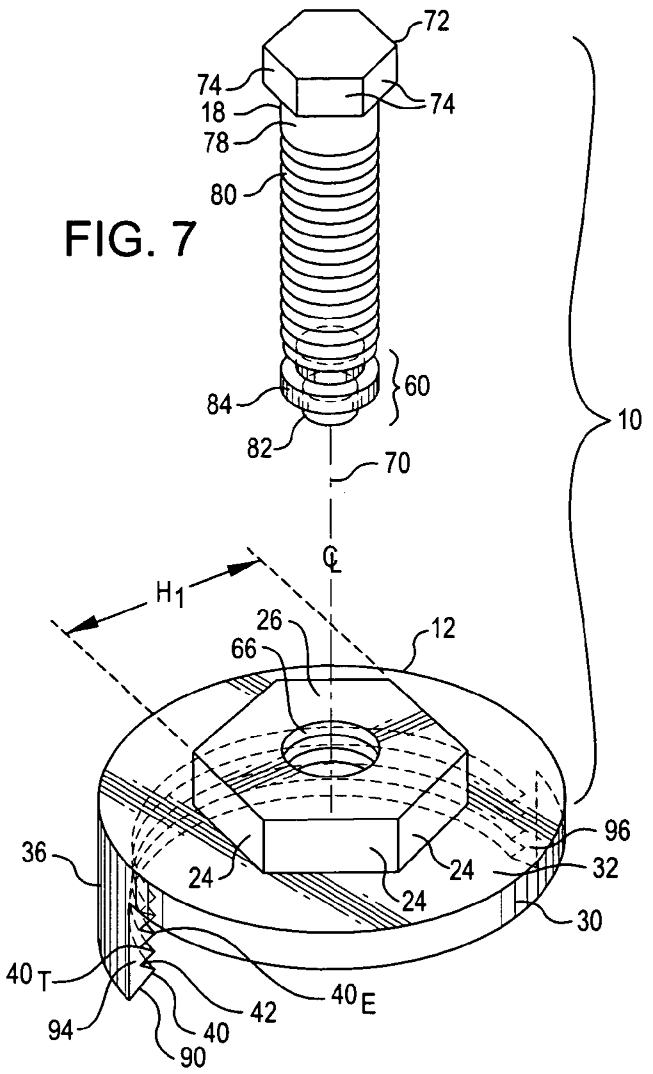
FIG. 7 shows a perspective view of the obverse side of a pulley removal tool, further illustrating the threaded bolt which inserted into the threaded receiving nut portion of the tool, as well as the perspective view of one side of the generally U-shaped flange (see FIG. 8 below) from which multiple groove engaging fingers extend for engagement with the grooves in a multiple-groove serpentine pulley.

Reference is now being made to FIGS. 1, 2, and 7. In FIG. 1, a perspective view of one embodiment of a pulley removal tool 10 is provided. In one embodiment, a monolithic, integral, one-piece structure 12 for a removal tool 10 is shown in a working position in interlocking mating engagement with a pulley 14 mounted on shaft 16. A threaded drive bolt 18 is turned as indicated by reference arrows 20 and 22, while the structure 12 is secured against rotation by suitable device such as a wrench (not shown) that can attain suitable purchase by engagement with lands 24 of a nut portion 26, here shown with nut portion 26 in a hex head configuration.

As better seen in FIGS. 3, 4, 5, and 6, the integral, one-piece structure 12 of the pulley removal tool 10 has a base 30, which in one embodiment can be provided in a circular cylindrical shape. The base 30 has an obverse side 32 on which the nut portion 26 is provided, and a reverse side 34 from which a flange 36 is provided. As shown in FIGS. 3, 4, 5, and 6, the flange 36 may be integrally provided in one piece with base 30 and nut portion 26, to provide structure 12. The flange 36 has a plurality of fingers 40 and grooves 42 therein sized and shaped for close mating engagement with the outer surface formation 44, including multiple grooves 46, of pulley 14, as is typical of a selected serpentine belt pulley 14.

Figure 5:
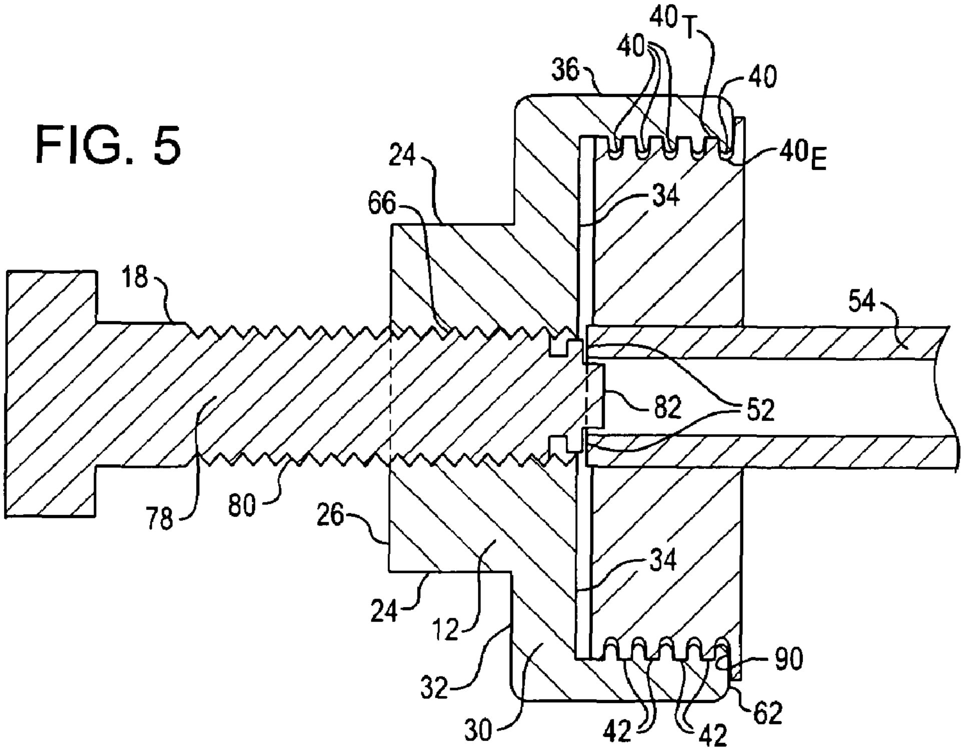
FIG. 5 illustrates a vertical cross-sectional view of a pulley removal tool, showing multiple fingers protruding from the flange of the tool in interlocking mating engagement with the grooves of a multi-groove serpentine drive pulley having a hollow or cylindrical tubular shaped drive shaft, with the pulley removal tool in position and ready to begin removal of the pulley from the shaft.
Figure 6:
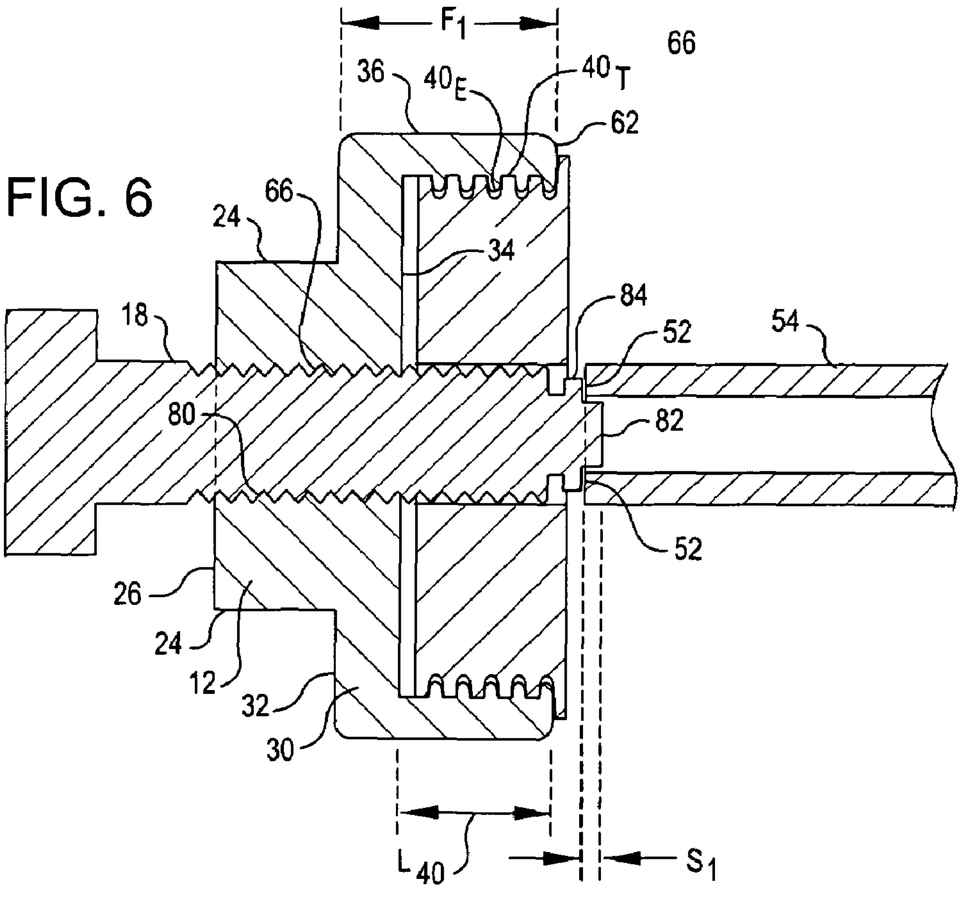
FIG. 6 illustrates a vertical cross-sectional view of a pulley removal tool, showing the tool as placed on a multi-groove serpentine drive pulley having a solid drive shaft as just illustrated in FIG. 5 above, but now showing the tool having just completed extraction of the pulley from the drive shaft, via engagement of an annular flanged end of the threaded bolt acting against the end of the shaft while the threaded bolt was turned relative to the tool.

The threaded drive bolt 18 is provided for working engagement with the end 50 of shaft 16, or with end 52 of cylindrical shaft 54 as shown in FIGS. 5 and 6. In operation, an end portion 60 of threaded drive bolt 18 engages end 50 of shaft 16, or end 52 of cylindrical shaft 54, so that by mechanical leverage between the structure 12 of the pulley removal tool 10 and the threaded drive bolt 18, force is exerted on the end 50 or 52 of shaft 16 or 54, respectively, to drive the pulley removal tool structure 12 away from the shaft end 50 or 52, while the pulley removal tool structure 12 securely grasps the pulley 14.

In one embodiment, a pulley removal tool 10 is provided for removing a pulley 14 from a shaft 16 having an end portion 52, wherein the pulley 14 has a multi-groove belt receiving outer surface formation 44. One suitable pulley removal tool 10 is provided with a monolithic one-piece integral structure 12.

A generally U-shaped pulley receiving flange 36 is provided. The flange 36 extends outwardly from the reverse side 34 of the base 30 to a flange end 62. The flange further has a plurality of fingers 40 extending transversely, or to the extent a circular configuration is provided, radially inwardly, from the flange 36. Distal ridges $\mathbf{40}_E$ define ends of fingers 40 and proximal troughs $\mathbf{40}_T$ define space between fingers 40. The fingers 40 are sized and shaped for interfitting mating engagement with the multi-groove belt receiving outer surface formation 44 of a pulley 14.

A nut portion 26 extends outwardly from the obverse side 32 of the body 30. The nut portion 26 includes a plurality of wrench purchase surface lands 24, such as may be in some embodiments provided with six lands 24 in a hex nut portion shape. In one embodiment, the hex head shape comprises opposing wrench receiving lands spaced apart a distance $H_1$. One suitable distance $H_1$ has been found to be to provide opposing lands 24 about 1.25 inches apart.

A threaded receiving portion is provided, defined by threaded sidewalls 66. The threaded receiving portion is centered with respect to the nut portion 26, along centerline 70. The threaded receiving portion extends through at least a portion of the body 30 or of at least a portion of the nut portion 26. In one embodiment, the threaded sidewalls 66 defining the threaded receiving portion may extend fully through both the nut portion 26 and the body 30, ending at the reverse side 34 of body 30.

A threaded drive bolt 18 is provided. The threaded drive bolt 18 includes wrench a receiving head portion 72 with purchase lands 74 such as provided by a hex head bolt as indicated in FIG. 7. The threaded drive bolt 18 includes a shaft 78 having an end structure 60. The shaft 78 has threads 80 along at least a portion thereof. The shaft 78 threads 80 are complementary to the threaded sidewalls 66 defining the threaded receiving portion. In one embodiment, the threaded receiving portion 66 is provided with threads in accordance with the 18 UNF-2B standard in a 0.625 inch nominal diameter for the threaded receiving portion, and fully threaded through structure 12.

As shown in FIG. 7, in one embodiment, the end structure 60 of the threaded drive bolt 18 includes a cylindrical pintle portion 82. Also, recessed toward head 72 a suitable distance $S_1$ is an annular shaft forcing working portion 84. The annular shaft forcing working portion 84 is sized and shaped for abutting engagement of the end 52 of a cylindrical shaft 54 of a pulley.

Thus, it can been from the components just described that the threaded drive bolt 18 and the nut portion 26 are sized and shaped for receiving mechanical leverage therebetween to produce relative motion with respect to each other, whereby the threaded drive bolt 18 acts on an end portion 50 or 52 of a shaft 16 or 54, respectively, to urge pulley 14 from a shaft, 16 or 54, on which the pulley 14 is mounted.

As briefly mentioned above, in one embodiment of a pulley removal tool 10, the nut portion 26 may be provided as an integral portion, in one piece, with the base 30 of structure 12. Similarly, in one embodiment, the flange 36 may be provided as an integral portion, in one piece of the base 30 of structure 12.

As can be seen in FIG. 5, in one embodiment, the distance $F_1$ between the obverse side 32 and the flange end 62 is about 1.65 inches. Also as seen in FIG. 5, the distance between the reverse side 34 and the flange end 62 can, in one useful embodiment, be provided in a distance L40 of about 0.75 inches. As seen in FIGS. 5 and 6, the flange 36 can be provided with a plurality of fingers 40. As illustrated, at least 3 full fingers 40 are provided. And, in some embodiments, it may be useful to provide an outermost finger 40 (closest to flange end 62) having a transverse outer sidewall 90.

Figure 8:
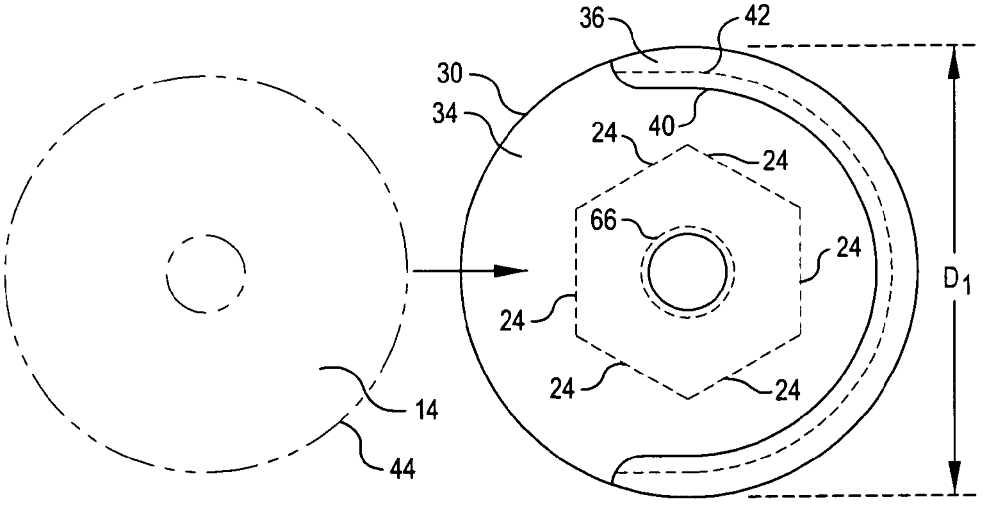
FIG. 8 shows the side view of the reverse side of a pulley removal tool, illustrating how a multiple groove serpentine drive pulley (shown in double dashed broken hidden lines), slides into the generally U-shaped flange from which the multiple groove engaging fingers (depicted by a generally U-shaped single dashed broken hidden line within the flange) protrude.

Also, as can be seen in FIGS. 7 and 8, the pulley removal tool 10 can be provided wherein the base 30 has a generally circular cylindrical shape. In one embodiment, as noted in FIG. 8, the diameter D1 of base 30 is provided at about 2.98 inches.

In one embodiment as seen in FIGS. 1, 2 and 7, the generally U-shaped flange 36 forms a U-shape structure extending circumferentially around body 30 between first 94 and second 96 entry walls.

It is to be appreciated that the various aspects and embodiments of a pulley removal tool as described herein are an important improvement in the state of the art. The monolithic, integral one-piece structure 12 for a pulley removal tool resilient, which in part defines an entry zone for securely receiving and engaging a pulley is a simple, robust, and reliable configuration for a pulley removal tool. Although only a few exemplary embodiments have been described in detail, various details are sufficiently set forth in the drawings and in the specification provided herein to enable one of ordinary skill in the art to make and use the invention(s), which need not be further described by additional writing in this detailed description.

Importantly, the aspects and embodiments described and claimed herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive or limiting. As such, this disclosure is intended to cover the structures described herein and not only structural equivalents thereof, but also equivalent structures.

Numerous modifications and variations are possible in light of the above teachings. Therefore, it is manifestly intended that this invention be limited only by the claims, and the legal equivalents thereof.

What is claimed is:

1. A pulley removal tool, for removing from a shaft having an end portion, a pulley having a multi-groove belt receiving outer surface formation, said pulley removal tool comprising:

a base, said base having an obverse side and a reverse side and a body therebetween;

a generally U-shaped pulley receiving flange, said flange extending outwardly from said reverse side of said base to a flange end, said flange further comprising a plurality of fingers extending transversely from said flange, said plurality of fingers having distal ridges defining ends of fingers and proximal troughs between fingers, said fingers sized and shaped for interfitting mating engagement with the multi-groove belt receiving outer surface formation of a pulley;

a nut portion, said nut portion extending outwardly from said obverse side of said body, said nut portion further comprising a plurality of wrench purchase surface lands;

a threaded receiving portion defined by threaded sidewalls, said threaded receiving portion centered with respect to said nut portion, said threaded receiving portion extending through at least a portion of said body of said base or of said nut portion;

a threaded drive bolt, said threaded drive bolt having a wrench receiving head portion and a shaft comprising an end structure, said shaft having shaft threads along at least a portion thereof, said shaft threads complementary to said threaded sidewalls of said threaded receiving portion;

wherein said threaded drive bolt and said nut portion are sized and shaped for receiving mechanical leverage therebetween to produce relative motion with respect to each other; and whereby said end structure of said threaded drive bolt acts on an end portion of a shaft to urge a pulley from a shaft on which the pulley is mounted.

2. The pulley removal tool as set forth in claim 1, wherein said nut portion comprises an integral portion of said base.

3. The pulley removal tool as set forth in claim 2, wherein said flange comprises an integral portion of said base.

4. The pulley removal tool as set forth in claim 1, wherein said threaded receiving portion is 0.625 inches in diameter.

5. The pulley removal tool as set forth in claim 1, wherein said threaded receiving portion comprises 18 UNF-2B type receiving threads.

6. The pulley removal cool as set forth in claim 1, herein said nut portion comprises a hex head shape.

7. The pulley removal tool as set forth in claim 6, wherein said hex head shape comprises wrench receiving lands spaced 1.25 inches apart.

8. The pulley removal cool as set forth in claim 6, wherein said hex head shape comprises an obverse side portion, and wherein the distance between said obverse side portion and said flange end is about 1.65 inches.

9. The pulley removal tool as set forth in claim 1, wherein said base comprises a generally circular cylindrical shape.

10. The pulley removal tool as set forth in clam 9, wherein said base has a diameter of about 2.98 inches.

11. The pulley removal tool asset forth in claim 9, wherein said generally U-shaped flange forms a U-shape structure extending, between first and second entry walls, circumferentially around said body.

12. The pulley removal tool as set forth in claim 1, wherein the distance between said reverse side of said base and said flange end is about 0.75 inches.

13. The pulley removal tool as set forth in claim 1, wherein said plurality of fingers comprises at least 3 full fingers.

14. The pulley removal tool as set forth in claim 1, wherein said plurality of fingers comprises an outermost finger having a transverse outer sidewall.

15. The pulley removal tool as set forth in claim 1, wherein said end structure of said threaded bolt comprises a cylindrical pintle portion.

16. The pulley removal tool as set forth in claim 15, wherein the shaft of the pulley is cylindrical, and wherein said end structure further comprises an annular shaft forcing working portion, said annular shaft forcing working portion sized and shaped for abutting engagement of a cylindrical shaft of a pulley.

17. A pulley removal tool, for removing from a shaft having an end portion, a pulley having a multi-groove belt receiving outer surface formation, said pulley removal tool comprising:

a base, said base having an obverse side and a reverse side and a body therebetween;

a generally U-shaped pulley receiving flange, said flange integrally formed with said base in a solid, one-piece configuration, said flange extending outwardly from said reverse side of said base to a flange end, said flange further comprising a plurality of fingers extending transversely from said flange, said plurality of fingers having distal ridges defining ends of fingers and proximal troughs between fingers, said fingers sized and shaped for interfitting mating engagement with the multi-groove belt receiving outer surface formation of a pulley;

a nut portion, said nut portion integrally formed with said base in a solid, once-piece configuration, said nut portion extending outwardly from said obverse side of said body, said nut portion further comprising a plurality of wrench purchase surface lands;

a threaded receiving portion defined by threaded sidewalls, said threaded receiving portion centered with respect to said nut portion, said threaded receiving portion extending through said body of said base and said nut portion;

a threaded drive bolt, said threaded drive bolt having a wrench receiving head portion and a shaft comprising an end structure, said shaft having shaft threads along at least a portion thereof, said shaft threads complementary to said threaded sidewalls of said threaded receiving portion;

wherein said Threaded drive bolt and said nut portion are sized and shaped for receiving mechanical leverage therebetween to produce relative motion with respect to each other; and whereby said end structure of said threaded drive bolt acts on an end portion of a shaft to urge a pulley from a shaft on which the pulley is mounted.

18. The pulley removal tool as set forth in claim 17, wherein said base, flange, and nut portion form an integral, one-piece pulley removal tool structure.

19. The pulley removal tool as set forth in claim 18, wherein said integral, one-piece pulley removal tool structure is oriented along a centerline, and therein said structure has a thickness along said centerline of about 1.65 inches.

20. The pulley removal tool as set forth in claim 18, wherein flange has a height, from said flange end to said reverse side of said base, of about 0.75 inches.

* * * * *

UNITED STATES PATENT AND TRADEMARK OFFICE

CERTIFICATE OF CORRECTION

PATENT NO. : 7,661,182 B2
APPLICATION NO. : 11/228003
DATED : February 16, 2010
INVENTOR(S) : Colin Cantrell It is certified that error appears in the above-identified patent and that said Letters Patent is hereby corrected as shown below:

Title page, item [57] line 5, after the words “close mating engagement”, insert --with--.

Column 2, line 7, after the word “which”, insert --is--.
Column 3, line 60, after “wrench”, delete “a”.
Column 4, line 12, after the words “it can”, delete “been”, and substitute therefore --be seen--.
Column 4, line 38, after the words “the diameter”, delete “D1”, and substitute therefore --$D_1$--.
Column 4, line 48, after the words “for a pulley removal tool”, delete “resilient”.

Column 5, line 50, Claim 6, after the words “pulley removal”, delete “cool”, and substitute therefore --tool--.
Column 5, line 55, Claim 8, after the words “pulley removal”, delete “cool”, and substitute therefore --tool--.
Column 5, line 63, Claim 11, after the words “pulley removal tool”, delete “asset”, and substitute therefore --as set--.
Column 6, line 49, Claim 17, after the words “wherein said”, delete “Threaded” and substitute therefore --threaded--.

Signed and Sealed this
Fifth Day of June, 2012

David J. Kappos
*Director of the United States Patent and Trademark Office*